March 21, 1933.  F. H. RICHTERKESSING  1,902,263
AUTOMATIC ELECTRIC SWITCH CONTROL
Filed Jan. 7, 1928

INVENTOR.
FRANK H. RICHTERKESSING
BY John L. Milton
ATTORNEY

Patented Mar. 21, 1933

1,902,263

UNITED STATES PATENT OFFICE

FRANK H. RICHTERKESSING, OF LOUISVILLE, KENTUCKY, ASSIGNOR TO CHEATHAM ELECTRIC SWITCHING DEVICE COMPANY, OF LOUISVILLE, KENTUCKY

AUTOMATIC ELECTRIC SWITCH CONTROL

Application filed January 7, 1928. Serial No. 245,182.

My invention relates to electrically operated track switches operated automatically from an electric trolley car.

One object of my invention is to produce a system that works "power on" or "power off", the system as hereinafter described.

Another object of my invention is to provide a system which will maintain current to the track switch operating mechanism for a period under the control of the speed of the trolley car, and always have enough time for switch operation regardless the speed of the car.

A still further object of my invention is to provide a system in which track switch operating current is supplied by contact engagement of a current collector with a contact element adjacent to a trolley wire, and wherein the magnitude of the arc established by the disengagement of the collector and contact element is reduced to such an extent so as not to be destructive.

Another feature of my invention is to provide a control system embodying relays and circuits of much simpler nature than heretofore used in combination with electric track switch operation. This feature is highly desirable for production and service.

My invention resides in the new and novel combination, construction and relation of the various electrically operated switches, circuits and other parts hereinafter more fully described and disclosed in the specification and drawing, in which.

Figures 1, 2:
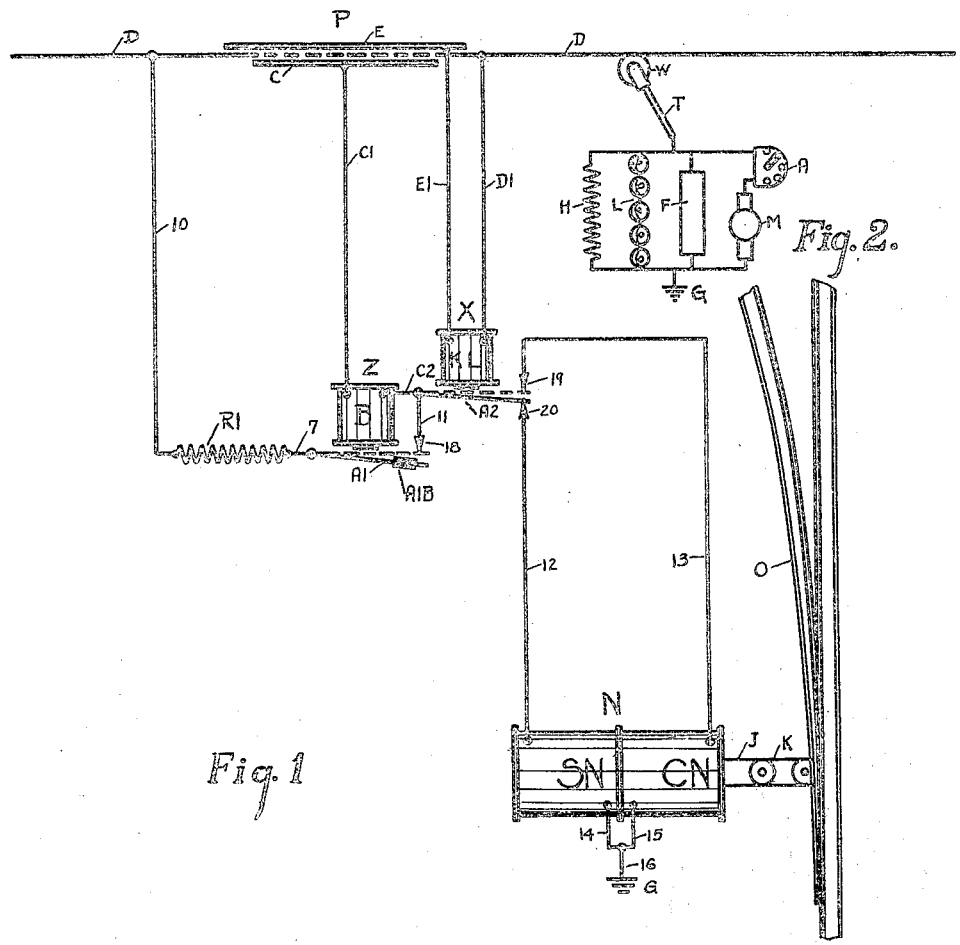
Fig. 1 is a schematic drawing showing the arrangement of parts and circuits when the system is in a normal condition. Under such circumstances, however, the switch tongue may be in either of its operable positions.
Fig. 2 is a schematic drawing showing the general arrangement of circuits usually found in an electrically operated car and which are taken account of in the operation of my invention.

My invention is intended primarily for use with those cars which are operated by means of an overhead trolley wheel or current collector W mounted on the car by means of a trolley pole T although it may be operated by cars in which current is supplied thereto by other methods. Most cars are equipped with heaters H, lights L, and air compressors F, which are connected between the trolley pole and ground. The cars are equipped with operating motors M and a controller A therefor, which is under the control of the car operator. When the controller is closed current will flow thru the motors M and this position I term "power on", and when the controller is open no current will flow thru the motors M and this position I term "power off". The controller A does not in any way control the current flowing thru the apparatus H, L, and F, which I term the auxiliary car current. The current flowing thru the motors M flows to ground G. I have arranged the system herein described so that the track switch will be operated to the "straight ahead" position when the collector W engages the trolley contactor P with "power off", and the track switch will be thrown to the "curved" position when the collector engages the system using "power on". This operation of the track switch, however, may be reversed by merely transposing the connections of the track switch operating solenoids as is evident to those skilled in the art.

In the system shown in Fig. 1, the letter D represents a trolley wire or conductor. Positioned adjacent the trolley conductor is a pan or trolley contactor P provided with two contact members E and C which are usually parallel and normally insulated from each other. The member E is electrically connected to the trolley conductor D at all times, but the member C is normally insulated, but is electrically connected thereto when the collector W engages the pan or trolley contactor P. The contact members E and C are so related to the trolley conductor that when the collector engages the contact members it will be out of engagement with the trolley conductor and remain so until it is about to pass out of engagement with the pan or trolley contactor. Such arrangement of the contact members and conductor is well known to those skilled in the art.

I also employ an electrically operated track switch N provided with two solenoids SN and CN each having a connection to the ground G, thru the common conductor 16.

The solenoids are provided with a reciprocating plunger J which is drawn inwardly when the solenoid SN is energized and drawn outwardly when the solenoid CN is energized. The plunger J is connected to the switch tongue O by means of the connecting link L. I also employ an electrically operated normally open relay X provided with an operating coil KL, and a switch arm A2 operating between contacts 19 and 20. The coil KL is mounted on a magnet core, which is also true of the other switch coil later referred to, although a moving plunger may be substituted for the magnet core, as is well known in the art. One terminal of the coil KL is connected to the contact member E of trolley contactor P by wire E1, and the other coil terminal is connected to the trolley conductor D by wire D1.

The switch arm A2 is normally in its free state, that is, not influenced by any magnetic flux, and rests against the normally closed contact 20, which is a back contact of relay X, and is connected thru wire 12 to solenoid SN of track switch N. When the switch arm A2 is influenced by a magnetic flux, it is removed from engagement with contact 20 and brought into engagement with contact 19, which is a front contact of relay X, and connected thru wire 13 to solenoid CN of track switch N. It will also be noted that the switch arm A2 is a common connecting point for one coil terminal of coil B and front contact 18 of relay Z, connections being made thru wires C2 and 11 respectively.

The other relay Z that I employ is equipped with an armature or switch arm A1 that normally rests against a backstop and out of engagement with any electrical contacts. The armature A1 is connected by wire 7 to one terminal of resistor R1, the other terminal of the resistor being connected to trolley conductor D by wire 10. The other terminal of coil B is connected thru wire C1 to contact member C of trolley contactor P.

If the current collector W engages the trolley contactor P with "power off," the contact members E and C will be electrically connected and of the same potential as the trolley conductor, since contact member E is electrically connected to the trolley conductor D at all times, by wire D1 connecting the trolley conductor D and low resistance coil KL, and wire E1 connecting the other terminal of coil KL and contact member E. Coil KL has a very low resistance as it usually consists of 10 or 12 turns of number 6 copper wire. Relay X is a "current selective" relay; that is, a very heavy current must pass thru its operating coil KL before it can affect its armature or switch arm A2. As soon as the contact member C is electrically connected to the trolley conductor, thru the manner just mentioned, switch operating current will flow from the trolley conductor D thru wire D1, coil KL, wire E1, contact member E, current collector W, contact member C, wire C1, coil B, wire C2, armature A2 of relay X, back contact 20 of relay X, wire 12, solenoid SN of track switch N, wire 14, wire 16 to ground G, and the coil B of relay Z will be energized and pick up its armature A1, that is, it will be brought into contact engagement with front contact 18. The resistance of coil B of relay Z is very low and permits a flow of current in the circuit just described of such value that the solenoid SN of track switch N will be energized, resulting in the track switch mechanism operating the track switch to the "straight ahead" position, as is arranged and described heretofore.

Although the current for the operation of relay Z and solenoid SN of track switch N was taken thru the coil KL of relay X, it should be understood that the current in this circuit although heavy is small comparatively to the current necessary to energize the coil KL to a point where its flux will attract the armature A2 of relay X.

When armature A1 was brought into contact engagement with front contact 18 and immediate auxiliary flow of current resulted, feeding from the trolley conductor D, thru wire 10, resistor R1, wire 7, armature A1, front contact 18, wire 11, armature A2, back contact 20, wire 12, solenoid SN of track switch N, wire 14, wire 16, to ground G. Thus all the current flowing to the solenoid SN of track switch N has a divided path, one path being established by the current collector W engaging contact members E and C as heretofore described, and the other thru armature A1 and front contact 18 of relay Z as mentioned above. Current will continue to flow to the solenoid SN through these two paths as long as the current collector W engages the trolley contactor with "power off," however, as soon as the current collector W disengages the trolley contactor P, the circuit conducting switch operating current to the solenoid SN thru coil B of relay Z will be opened. It is well known to those familiar with the art however, that as soon as the current collector W disengages the contact member C of trolley contactor P, the circuit through coil B of relay Z will not be instantly opened, since current will remain in the circuit for a short interval through the arc established between the contact member C and the current collector W. It must be also understood that the coil B of relay Z is so proportioned that it will retain its armature A1 in contact engagement with its front contact 18 as long as current flows in this circuit even though it be established through the arc just mentioned. It is evident therefore that the armature A1 of relay Z will not release until the current flowing through the operating coil B has reached zero. From the foregoing it will be obvious that the resistance unit R1 will be retained connected in multiple with the circuit including relay coil B and connecting the armature A2 of relay X, as long as current flows through the operating coil B. Thus with further reference to Fig. 1, and in view of the foregoing, it will be apparent that at the instant the current collector W disengages the contact member C of trolley contactor P, an arc will be established between the current collector W and contact member C, resulting from opening the comparatively heavy switch operating current which was being conducted to solenoid SN through coil B of relay Z. As the arc is extended in length the resistance of the arc is considerably increased thereby progressively decreasing the value of the current flow through coil B of relay Z to the switch operating solenoid SN. It will be further apparent that the value of the arc broken between the current collector W and contact member C will be dependent upon the relations of the resistance unit R1 and the resistance of the arc formed between the current collector W and contact member C. The value of this arc instant to the disengagement of the current collector W and contact member C, can be conceived as being the maximum current flowing through coil B of relay Z for energizing the solenoid SN of track switch N, while the value of this arc at the time it will be broken between the current collector W and contact member C, can be conceived as zero current flow through coil B of relay Z (since this circuit will be opened) and at a maximum voltage value governed by the resistance unit R1 held in multiple with this branch of the circuit. Therefore, the maximum value of the arc established between the current collector W and contact member C of trolley contactor P, can not exceed the maximum current strength flowing through coil B of relay Z for energizing track switch solenoid SN, and at the maximum voltage drop across the resistance unit R1 when the current reaches zero in coil B of relay Z.

In the foregoing, the arc occurring between the current collector W and contact member C was described as being extended. This however must be regarded as a matter of degree and for the purpose of study, since the spirit of the invention is to reduce this arc to a practical minimum. It is an established fact that the amount an arc of a given current strength can be extended, is dependent primarily on the impressed voltage, that is, the higher the voltage the longer the arc can be extended. Therefore, it will be obvious that if wire 10, in applicant's system, were disconnected from the current conductor D, the arc at contact member C of trolley contact P could be extended to a greater length dependent upon the high impressed voltage between the conductor D and ground G. This arc is very destructive, and over an extended period would cause considerable damage to occur to trolley contactor P. In applicant's system the resistance unit R limits the voltage drop across this arc, thereby considerably reducing the amount it can be extended, consequently materially increasing the life of the contactor P and reducing electrical erosion to the current collector W. The lower the ohmic resistance of resistance unit R1 the lower will be the voltage drop across the arc. This in effect utilizes the well known principle employed in rheostats, of not permitting the circuit to be entirely opened until the last of the series of steps is reached. In other words, resistance is successively introduced into the circuit without apparent destructive arcing between the contact arm and contacts. It is believed that a lengthy discussion of this is unnecessary since it will be apparent to those familiar with the art the affect of a switch arm sliding over a wound rheostat. From the foregoing it will be apparent that the system discussed herein can be regarded as a two step or single stage rheostat. It is also obvious that the number of Z relays could be indefinitely increased, and the operation of each be dependent upon the operation of the former one, and in this manner increase the number of stages to such an extent that arcing would be practically entirely eliminated.

The opening of this path opened the circuit of coil B of relay Z, and it immediately released its armature A1 which opened the other branch feed to the solenoid SN. It can be seen that by giving the proper values to the resistance of coil B of relay Z and resistor R1, that a greater portion of the current could be broken at contact 18 of relay Z. Contact 18 is located within a magnetic blowout which is symbolically represented by A1B. As is known to those skilled in the art of relay construction, an arc broken within a magnetic field, known as a magnetic blowout, is very quickly and easily broken and all the deterioration of large destructive arcs is eliminated.

If the current collector initially engages the pan or trolley contactor P with "power on" the coil KL of relay X will be instantly energized and pick up its armature A2; that is, armature A2 will be brought into engagement with front contact 19 and out of engagement with back contact 20. As soon as the current collector or trolley wheel W engages contact members E and C they will be electrically connected and of the same potential as the trolley conductor D, as heretofore described, and incident to this operation current will flow from trolley conductor D, thru wire D1, coil KL of relay X, wire E1, contactor member E, current collector W, contact member C, wire C1, coil B, of relay Z, wire C2, armature A2 of relay X, front contact 19, wire 13, solenoid CN of track switch N, wire 15, to ground G, thru wire 16. Relay Z will then operate in the same manner as heretofore described. The resistance of coil B of relay Z is very low and permits a flow of current in the circuit just described, of such magnitude that the solenoid CN of track switch N will be energized, resulting in the track switch mechanism operating the track switch to the "curved" position, however, no change will occur in the position.

To sum up the operation of the system, if the car operator desires to go straight ahead he sets his controller "power off" with the intention of coasting past trolley contactor P. As soon as the current collector W engages the trolley contactor P, relay Z will operate and the track switch will operate to the "straight ahead" position.

If the car operator desires to take the "curve" he will turn his controller to "power on" with the intention of passing the contactor drawing power. When the current collector W engages the trolley contactor P with "power on", relay X will first operate to select the "curve" track magnet operating circuit, and then relay Z will operate and the track switch will operate to the "curved" position.

There are, of course, modifications and arrangements of the parts which may be made from that shown in the above disclosure and which will still fall within the scope of my invention.

I claim:—

1. A switch operating system comprising an electrically operated track switch, a trolley conductor, a trolley contactor to be engaged by a current collector, a divided switch operating circuit for conducting current to the track switch solenoids for operating the switch in the direction desired when the current collector engages the trolley contactor with "power on" or "power off", a relay having an operating coil in series with one branch of the said divided switch operating circuit, a second circuit of relatively low resistance arranged to include said branch of the said switch operating circuit, said relay operable to control the said second circuit.

2. A switch operating system comprising an electrically operated track switch, a trolley conductor, a trolley contactor to be engaged by a current collector, a divided switch operating circuit for conducting current to the track switch solenoids for operating the switch in the direction desired when the current collector engages the trolley contactor with "power on" or "power off", a relay having an operating coil arranged to be placed in series with the track switch solenoid selected, said relay to affect the opening of the said switch operating circuit, upon disengagement of the current collector and trolley contactor.

3. A switch operating system comprising an electrically operated track switch, a trolley conductor, a trolley contactor to be engaged by a current collector, a divided switch operating circuit for conducting current to the track switch solenoids for operating the switch in the direction desired when the current collector engages the trolley contactor with "power on" or "power off", a relay having an operating coil arranged to be placed in series with the track switch solenoid selected, said relay to affect the opening of the said switch operating circuit, upon disengagement of the current collector and trolley contactor, to reduce the current broken at the trolley contactor to a practical minimum.

4. A switch operating system comprising an electrically operated track switch, a trolley conductor, a trolley contactor to be engaged by a current collector, a divided switch operating circuit for conducting current to the track switch solenoids for operating the switch in the direction desired when the current collector engages the trolley contactor with "power on" or power off", a branched feed circuit, a relay having an operating coil in series with one branch of the branched feed circuit and in circuit with the track switch operating circuit selected, and means operated by said relay to affect the opening of the said switch operating circuit, upon disengagement of the current collector and trolley contactor.

5. In a system of the class described, the combination of an electrically operated track switch, a trolley conductor, a current collector, a trolley contactor to be engaged by a current collector, an actuating solenoid, a normally open circuit connecting the trolley conductor and actuating solenoid, a relay operable to selectively direct currents through different parts of the actuating solenoid, and a second relay in series with the said normally open circuit operable to interpose resistance in the said circuit upon disengagement of the said current collector and trolley contactor to affect the currents flowing thru the said solenoid.

6. In a system of the class described, the combination of an electrically operated track switch, a trolley conductor, a trolley contactor to be engaged by a current collector, an actuating solenoid, a normally open circuit connecting the trolley conductor and actuating solenoid, a relay operable to selectively direct currents through different parts of the actuating solenoid, and a second relay having an operating coil in series with one branch of the normally open circuit connecting the trolley conductor and actuating solenoid, and arranged to be in series with the part of the actuating solenoid selected to affect the current flowing in that circuit.

7. A switch operating system, comprising an electrically operated track switch, a trolley contactor to be engaged by a current collector, a divided switch operating circuit for conducting currents to the track switch solenoids for operating the switch in the direction desired when the current collector engages the trolley contactor with "power on" or "power off", a trolley contactor circuit including one or other of the track switch solenoids, a relay having an operating coil included in the said circuit, operable to affect the current flowing to the track switch solenoid upon disengagement of the current collector and trolley contactor.

8. A switch operating system, comprising an electrically operated track switch, a trolley conductor, a trolley contactor to be engaged by a current collector, a divided switch operating circuit for conducting currents to the track switch solenoids for operating the switch in the direction desired when the current collector engages the trolley contactor with "power on" or "power off", a trolley contactor circuit including the track switch solenoid selected, a relay having an operating coil in series with the said circuit, said relay to interpose resistance across the trolley conductor and trolley contactor to affect the amount of current broken by the current collector and trolley contactor.

9. In a system of the class described, the combination of a trolley contactor to be engaged by a current collector, an actuating solenoid, of a normally open circuit including the said actuating solenoid and trolley contactor, a relay for selectively directing currents through the different parts of said solenoid, and a second relay, and a second normally open circuit including the said actuating solenoid and the armature of the said second relay, and means for connecting the said second circuit to a power line to affect the currents flowing through the said solenoid upon disengagement of the said current collector and trolley contactor.

10. In a system of the class described, the combination of a normally open circuit including an actuating solenoid, a relay adapted to selectively direct current through different parts of said solenoid, and a second relay having an operating coil arranged in series between the first relay and either branch of the said actuating solenoid, said relay arranged to be picked up upon a flow of solenoid saturating current through the said operating coil to increase the current flowing in the said solenoid circuit.

11. In a system of the class described, the combination of a normally open circuit including a track solenoid, a relay for selectively directing currents through different parts of the said solenoid, and a second relay, and a second normally open circuit including the armatures of the relays and the track solenoid, and means for successively closing the normally open circuits with a source of power and then opening same.

12. A switch operating system comprising an electrically operated track switch, a trolley conductor, a trolley contactor to be engaged by a current collector, a switch operating circuit for conducting current to a track switch solenoid for operating the said track switch, a relay having an operating coil in series with the said track switch solenoid, said relay operable to affect the opening of the said switch operating circuit upon disengagement of the current collector and trolley contactor.

13. A switch operating system comprising an electrically operated track switch, a trolley conductor, a trolley contactor to be engaged by a current collector, a switch operating circuit for conducting current to a track switch solenoid for operating the said track switch, a relay having an operating coil in series with the said track switch solenoid, said relay operable to affect the opening of the said switch operating circuit upon disengagement of the current collector and trolley contactor to reduce the current broken at the trolley contactor to a practical minimum.

14. A switch operating system comprising an electrically operated track switch, a trolley conductor, a trolley contactor to be engaged by a current collector, a switch operating circuit for conducting current to a track switch solenoid for operating the said track switch, a branched feed circuit, a relay having an operating coil in series with one branch of the branched feed circuit, and means controlled by said relay to affect the opening of the said switch operating circuit upon disengagement of the current collector and trolley contactor.

15. In a system of the class described, the combination of an electrically operated track switch, a trolley conductor, a current collector, a trolley contactor to be engaged by a current collector, an actuating solenoid, a normally open circuit connecting the trolley conductor and actuating solenoid, a relay in series with the said normally open circuit, operable to interpose resistance in the said circuit upon disengagement of the said current collector and trolley contactor to affect the current flowing through the said solenoid.

16. In a control system, comprising an electrically operated device, a source of power a circuit connecting the source of power and said device, a contact means in the said circuit, and means operable upon disengagement of the said contact means to temporarily interpose resistance in parallel with the said contact means to affect the current flowing through the said device.

In testimony whereof I affix my signature.

FRANK H. RICHTERKESSING.